(12) United States Patent
Nakamura

(10) Patent No.: US 8,171,603 B2
(45) Date of Patent: May 8, 2012

(54) HOSE CLAMPS

(75) Inventor: Yuji Nakamura, Aichi (JP)

(73) Assignee: Togo Seisakusyo Corporation, Aichi-ken (JP)

( * ) Notice: Subject to any disclaimer, the term of this patent is extended or adjusted under 35 U.S.C. 154(b) by 301 days.

(21) Appl. No.: 12/594,321

(22) PCT Filed: Apr. 3, 2008

(86) PCT No.: PCT/JP2008/056669
§ 371 (c)(1),
(2), (4) Date: Oct. 1, 2009

(87) PCT Pub. No.: WO2008/126754
PCT Pub. Date: Oct. 23, 2008

(65) Prior Publication Data
US 2010/0083472 A1    Apr. 8, 2010

(30) Foreign Application Priority Data
Apr. 6, 2007  (JP) .................................. 2007-100616

(51) Int. Cl.
*B65D 63/02*   (2006.01)
(52) U.S. Cl. ..................... 24/20 R; 24/23 W; 24/20 CW
(58) Field of Classification Search ................... 24/23 R, 24/23 W, 20 S, 22, 20 CW
See application file for complete search history.

(56) References Cited

U.S. PATENT DOCUMENTS

| | | | | |
|---|---|---|---|---|
| 5,596,790 A | * | 1/1997 | Moller | 24/20 EE |
| 5,864,926 A | * | 2/1999 | Gyongyosi et al. | 24/20 R |
| 6,389,650 B1 | * | 5/2002 | Yamada et al. | 24/20 R |
| 6,438,801 B1 | * | 8/2002 | Yamada | 24/20 R |

FOREIGN PATENT DOCUMENTS

| | | |
|---|---|---|
| JP | 2001-90886 | 4/2001 |
| JP | 2001-159491 | 6/2001 |
| JP | 2001-280566 | 10/2001 |
| JP | 2003-90474 | 3/2003 |

* cited by examiner

*Primary Examiner* — Robert J Sandy
*Assistant Examiner* — Michael Lee
(74) *Attorney, Agent, or Firm* — Patterson Thuente Christensen Pedersen, P.A.

(57) ABSTRACT

A hose clamp has a clamp body, operation pieces, an engaging claw, a receiving portion, an arch shaped opening and a slide guide portion. The clamp body is composed of a plate spring member bent into a ring shape. The operation piece has two legs at one end of the clamp body, and has an operation portion at ends of the legs. The operation piece has a leg at the other end of the clamp body, and has an operation portion at an end portion of the leg. The receiving portion is formed on the operation portion and can engage with the engaging claw. The arch shaped opening is formed on the operation portion, and allows the engaging claw to pass therethrough. The engaging claw and the slide guide portion are disposed on one side of the leg of the operation piece. The slide guide portion contacts with the leg in order to make the engaging claw be opposed to the arch shaped opening.

3 Claims, 7 Drawing Sheets

HOSE CLAMPS

TECHNICAL FIELD

The present invention relates to hose clamps used for tightening hoses.

BACKGROUND ART

A known hose clamp will be described. Here, FIG. 17 is a perspective view showing a main part of a hose clamp that has been expanded. FIG. 18 is also a perspective view showing a main part of the hose clamp that has been constricted. FIG. 19 is a plan view showing a second operation piece.

As shown in FIG. 17, a hose clamp 910 has a clamp body 910A composed of a plate spring curved into a ring shape. A first operation piece 913 having a pair of legs 913a is formed on one end of the clamp body 910A. The first operation piece 913 has an operation portion 914 bent outwardly in a radial direction at ends of the legs 913a. In addition, a second operation piece 917 having a single leg 917a and protruding through a space between the legs 913a of the first operation piece 913 is formed on the other end of the clamp body 910A. The second operation piece 917 has an operation portion 938 bent outwardly in the radial direction at an end of the leg 917a and opposed to the operation portion 914 of the operation piece 913.

As shown in FIG. 18, an engaging claw 939 protruding outwardly in the radial direction is formed on the leg 917a of the second operation piece 917. In addition, the operation portion 914 of the first operation piece 913 has a receiving portion 930 and an opening 931. When the clamp body 910A is expanded, the receiving portion 930 can engage with the engaging claw 939, and while the clamp body 910A constricts, the opening 931 allows the engaging claw 939 to pass therethrough. Furthermore, an inclined slide guide portion 937 is formed on the leg 917a of the second operation piece 917. When the operation portions 914 and 938 come close to each other, the slide guide portion 937 slidably contacts with the leg 913a of the first operation piece 913 in order to make the engaging claw 939 be opposed to the opening 931.

Here, a hose clamp having the aforementioned construction is disclosed in, for example, Japanese Laid-Open Patent Publication No. 2003-090474.

DISCLOSURE OF THE INVENTION

Problems to be Solved by the Invention

In accordance with the known hose clamp 910, as shown in FIG. 19, the engaging claw 939 and the slide guide portion 937 are provided at opposite sides of the second operation piece 917. Therefore, when widths of the second operation piece 917, the operation portion 938 and the engaging claw 939 are represented by 917 W, 938 W and 939 W, it is able to express as 917 W=938 W+939 W. Accordingly, it is necessary to broaden the width 917 W of the second operation piece 917. In addition, it is necessary to broaden an interval between the both legs 913a of the first operation piece 913 for passing the operation piece 917, and as a result, the width 913 W of the first operation piece 913 (refer to FIG. 17) should be broadened. Therefore, there has been a problem that the hose clamp 910 must have a large size.

A problem to be solved by the present invention is to provide compact hose clamps by narrowing the widths of both of the operation pieces.

Means for Solving the Problem

In accordance with a first aspect of the invention, a hose clamp has a clamp body, a first operation piece, a second operation piece, an engaging portion, a receiving portion, an opening, and a slide guide portion. The clamp body is composed of a plate spring curved into a ring shape. The first operation piece has a pair of legs at one end portion of the clamp body, and a first operation portion bent outwardly in a radial direction at end portions of the legs. The second operation piece has one leg at the other end portion of the clamp body, and a second operation portion at an end portion of the leg. The end portion of the leg protrudes through a space between the legs of the first operation piece. In addition, the second operation portion is bent outwardly in the radial direction and is opposed to the first operation portion. The engaging portion is provided on the leg of the second operation portion, and protrudes outwardly in the radial direction. The receiving portion is formed on the first operation portion, and can engage with the engaging portion when the clamp body is expanded. The opening is formed in the first operation portion, and allows the engaging portion to pass through there while the clamp body constricts. The slide guide portion is provided on the leg of the second operation piece. In addition, when the operation portions come close to each other, the slide guide portion makes the engaging portion be opposed to the opening by slidably contacting with one of the legs of the first operation piece. The engaging portion and the slide guide portion are disposed at one side of the leg of the second operation piece.

In the aforementioned hose clamp, it is able to keep the clamp body in an expanded state by engaging the engaging portion of the second operation piece with the receiving portion of the first operation piece due to resilient deformation of the clamp body. In addition, when the both operation portions come close to each other, the engaging portion leaves from the receiving portion, and the slide guide portion of the second operation piece slidably contacts with one of the legs of the first operation piece, so that the engaging portion of the second operation piece is opposed to the opening of the first operation piece. Then, when both operation portions are released, the engaging portion passes through the opening and the clamp body deforms and constricts due to resilient restoring force of the clamp body.

Incidentally, the engaging portion and the slide guide portion are disposed at one side of the leg of the second operation piece in order to narrow a width of the second operation piece. In accordance with this, it is able to narrow a width of the first operation piece by narrowing an interval between the both legs of the first operation piece for passing the second operation piece through there. In this way, the hose clamp can be downsized due to narrowing of the widths of the both operation pieces.

In one embodiment, the engaging portion is formed close to the slide guide portion. Such configuration downsizes the second operation piece, thereby reducing weight of the clamp body.

In one embodiment, the engaging portion is bent relative to the second operation piece around a folding line substantially parallel to a width direction of the second operation piece, and, in another embodiment, is bent around a folding line substantially perpendicular to the width direction of the second operation piece.

In accordance with a second aspect of the invention, a hose clamp has a clamp body, a pair of legs, an engaging portion, a receiving portion and a slide guide portion. The clamp body is composed of a band shaped resilient member curved into a ring shape, and has a first operation piece and a second operation piece at opposite sides with respect to a circumferential direction. The pair of legs defines a slot therebetween in the first operation piece. The second operation piece protrudes through the slot. The engaging portion is formed on the second operation piece. The receiving portion is formed on the first operation piece, and can engage with the engaging portion. The engaging portion and the receiving portion can relatively move between an engaging position for engaging with each other and a disengaging position. The slide guide portion is formed on the second operation piece. When the engaging portion and the receiving portion relatively move from the engaging position to the disengaging position, the slide guide portion slidably contacts with one of the legs. The engaging portion and the slide guide portion are disposed at the same side in a width direction of the second operation piece.

In one embodiment, the clamp body has a uniform board thickness. Such construction facilitates production of the clamp body.

In addition, in another embodiment, the first operation piece has a guide edge at one of the legs, and the guide edge inclines outwardly in the width direction toward an end of the first operation piece. The slide guide portion slidably contacts with the leg via the guide edge. Such construction facilitates the aforementioned sliding contact.

Figure 1:
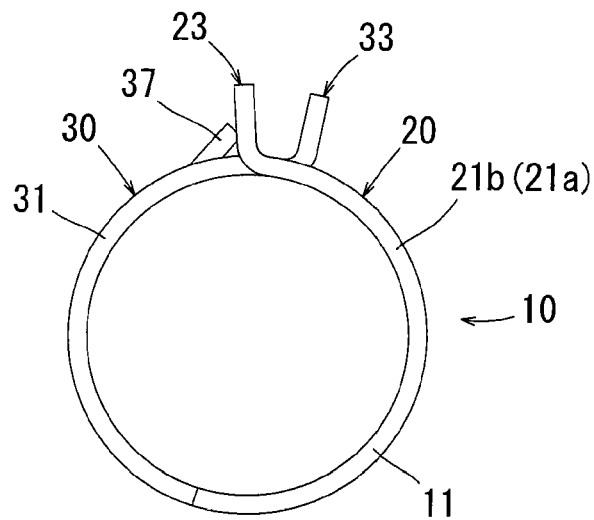
FIG. 1 is a side view of an expanded hose clamp according to one embodiment of the present invention.

EXPLANATIONS OF NUMERALS 10 hose clamp
11 clamp body
20 first operation piece
21a, 21b leg
23 operation portion
25 receiving portion
27 arch shaped opening (opening)
29 guide edge
30 second operation piece
31 leg
33 operation portion
36 slide guide portion
37 engaging claw (engaging portion)
137 engaging claw (engaging portion)
137A protrusion
337 engaging claw (engaging portion)
427 opening

BEST MODE FOR CARRYING OUT THE INVENTION

Figure 2:
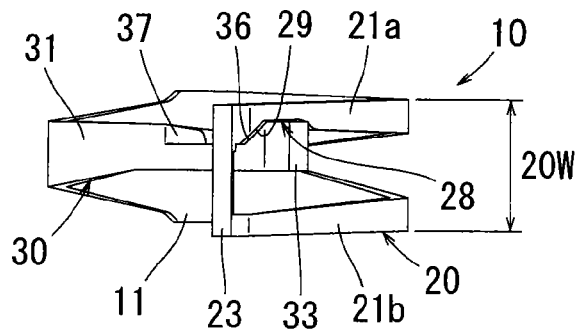
FIG. 2 is a plan view of the expanded hose clamp.
Figure 3:
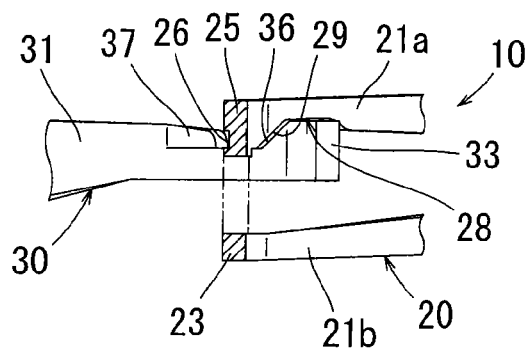
FIG. 3 is a plan view partly in section of a main part of the expanded hose clamp.
Figure 4:
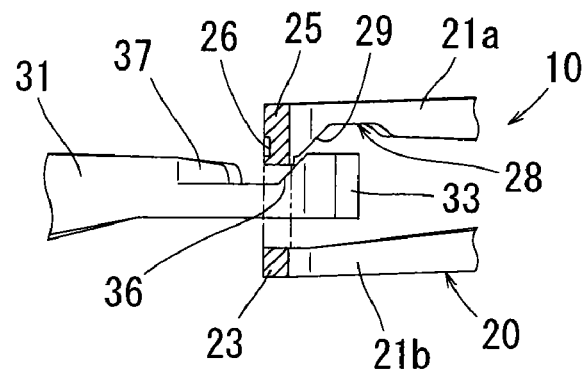
FIG. 4 is a plan view partly in section of a main part of a hose clamp, both operation portions of which are close to each other.
Figure 5:
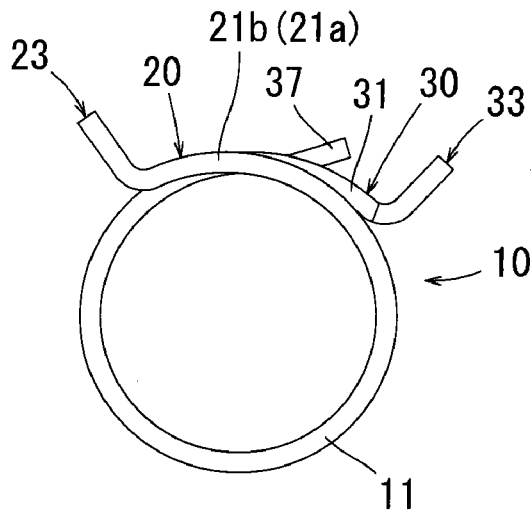
FIG. 5 is a side view of a constricted hose clamp.
Figure 6:
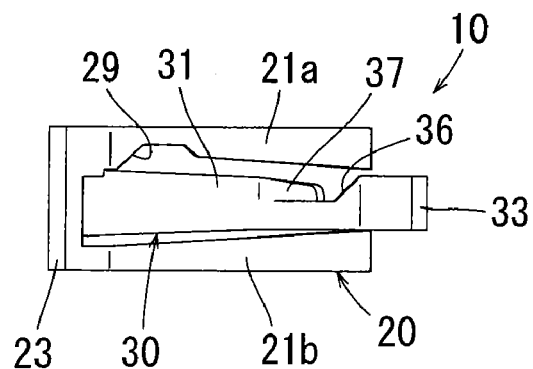
FIG. 6 is a plan view of the constricted hose clamp.
Figure 7:
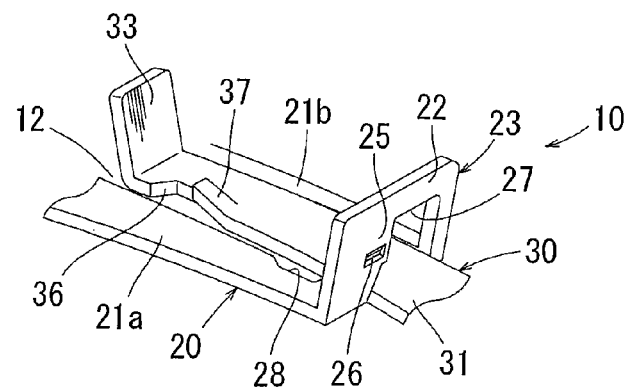
FIG. 7 is a perspective view of a main part of the constricted hose clamp.
Figure 8:
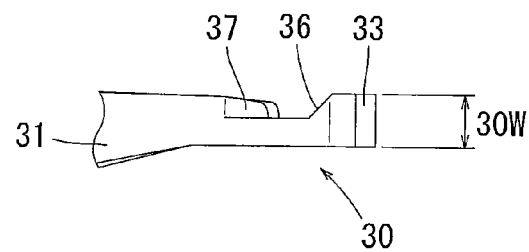
FIG. 8 is a plan view showing a second operation piece.
Figure 9:
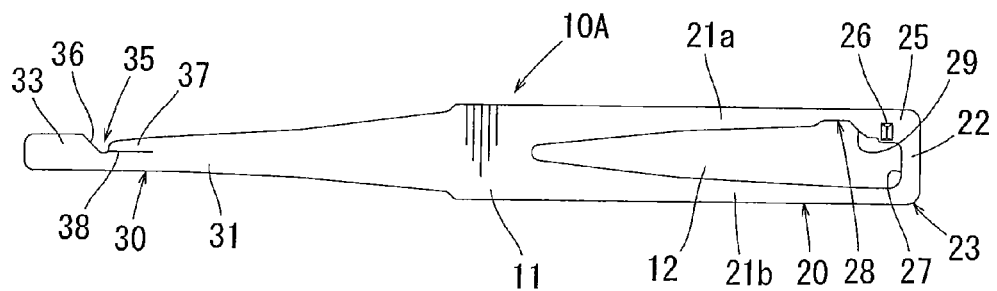
FIG. 9 is a development view of the hose clamp.

One embodiment of the invention will be described. Here, FIG. 1 is a side view showing a hose clamp that has been expanded. FIG. 2 is a plan view of the expanded hose clamp. FIG. 3 is a plan view, with a part cross section, showing the expanded hose clamp. FIG. 4 is a plan view, with a part cross section, showing the hose clamp in a state that both operation portions come close to each other. FIG. 5 is a side view showing the hose clamp that has been constricted. FIG. 6 is a plan view showing the constricted hose clamp. FIG. 7 is a perspective view showing a main part of the constricted hose clamp. FIG. 8 is a plan view showing a second operation piece. FIG. 9 is a development view of the hose clamp.

As shown in FIG. 1, a hose clamp 10 has a clamp body 11, and the clamp body is formed by curving a blank 10A composed of a band shaped plate spring made of metal (refer to FIG. 9) into a ring shape. Here, in this specification, the term "width direction" means a direction perpendicular to a longitudinal direction of the clamp body 11, and the term "axial direction" means a direction of an axis of a hose inserted into the bent clamp body. The width direction and the axial direction are substantially parallel.

As shown in FIG. 9, a first operation piece 20 is provided on an end of the clamp body 11 and has two legs 21a and 21b formed by providing a slot 12 extending in the longitudinal direction and a connecting portion 22 extending between an end of the leg 21a and an end of the leg 21b. The slot 12 extends in the direction of the length of the blank 10A or the clamp body 11 and has a width gradually narrowed toward a central region of the blank 10A. An operation portion 23 is formed by bending an arch shaped end portion of the first operation piece 20 outwardly in a radial direction (refer to FIG. 7).

As shown in FIG. 9, a second operation piece 30 having a single leg 31 narrowed toward a leading end is formed on an opposite side to the first operation piece 20 in the clamp body 11. An operation portion 33 is provided on the end of the second operation piece 30, and the operation portion 33 protrudes through a space between the legs 21a and 21b of the first operation piece 20. In addition, the operation portion 33 is bent outwardly in the radial direction and is opposed to the operation portion 23 of the operation piece 20 (refer to FIG. 7). The leg 31 of the second operation piece 30 fits loosely between the legs 21a and 21b of the first operation piece 20. A concave portion 35 in a substantially V-shape is formed on an end portion of the leg 31, i.e., on one side (upper side in FIG. 9) of a connection part connecting to the operation portion 33. And, a surface of the concave portion 35 on the side of operation portion 33 defines a slide guide portion 36.

The slide guide portion 36 is inclined such that it is broadened toward the end of the clamp body 11.

As shown in FIG. 7, on one side of the leg 31 of the second operation piece 30, on which the slide guide portion 36 is formed, an engaging claw 37 is formed by cutting and bending. In particular, as shown in FIG. 9, a slit 38 linearly extending from a bottom part of the concave portion 35 toward the central region of the blank 10A is formed in the leg 31, and the engaging claw 37 is formed by bending a claw, which is defined by the slit 38, outwardly in the radial direction in an inclined manner (refer to FIG. 7). In addition, the engaging claw 37 is configured to be narrowed from the central region of the clamp body 11 toward the leading end. Here, the engaging claw 37 corresponds to "engaging portion" in this specification.

As shown in FIG. 7, a receiving portion 25 is formed on a corner portion defined by the leg 21a on one side (on the left side in FIG. 7) and the connecting portion 22. In an outside surface of the receiving portion 25, that is, a surface not opposed to the operation portion 33, an engaging depression 26 capable of receiving an end portion of the engaging claw 37 and having a bottom is formed. In addition, an arch shaped opening 27 is formed in a corner portion defined by the other leg 21b (on the right side in FIG. 7) and the connecting portion 22. The receiving portion 25 and the arch shaped opening 27 are arranged side by side in the width direction of the operation portion 23. Here, the arch shaped opening 27 corresponds to "opening" in this specification.

As shown in FIG. 9, a cutout concave portion 28 adjacent to the receiving portion 25 and communicating with the slot 12 is formed on the leg 21a on one side of the first operation piece 20. The cutout concave portion 28 is formed by cutting out a part of the leg in a trapezoidal shape, and broadens toward the slot 12. An edge of the cutout concave portion 28 on the side of the receiving portion 25 is configured as a guide edge 29 allowing the slide guide portion 36 of the second operation piece 30 to slidably contact therewith. The guide edge 29 is inclined outwardly in the width direction toward the end of the first operation piece. Incidentally, the cutout concave portion 28 can be formed by cutting out a part of the leg in a triangular shape.

In the aforementioned hose clamp 10, the engaging claw 37 of the second operation piece 30 engages with the operation portion 23 of the first operation piece 20 (in particular, the engaging depression 26 of the receiving portion 25) due to resilient deformation of the clamp body 11 (refer to FIG. 3). Thus, the clamp body 11 is held to be expanded (refer to FIGS. 1 and 2). This state is referred to as an expanded state of the hose clamp 10. And, in this expanded state, as shown in FIG. 2, the second operation piece 30 is in a state to be offset relative to the first operation piece 20 along the axial direction of the clamp body 11 (upwardly in FIG. 2) due to the resilient deformation of the clamp body 11. In addition, a part of the first operation piece 20 including the guide edge 29 of the leg 21a fits with the concave portion 35, and the guide edge 29 of the first operation piece 20 and the slide guide portion 36 of the second operation piece 30 contact with each other or are located proximal to each other (refer to FIG. 3). Here, the hose clamp 10 in the expanded state is transported to an operating site for connecting a hose 40 to the hose clamp 10.

Next, in the operating site, the hose (not shown) is connected to a predetermined piping member (not shown). After the hose passing through the clamp body 11 of the hose clamp 10 along its axis is connected with the piping member due to its elasticity, the hose clamp 10 is located on a connected region of the piping member and the hose, and the expanded state of the hose clamp 10 is released. That is, engagement between the receiving portion 25 and the engaging claw 37 is released by bringing the operation portions 23 and 33 close to each other by a tool, such as pliers or pincers (not shown). In addition, the slide guide portion 36 of the second operation piece 30 slides on the guide edge 29 of the first operation piece 20, so that the leg 31 of the second operation piece 30 moves in a direction apart from the leg 21a on one side of the first operation piece 20 (refer to FIG. 4). At this time, the leg 31 of the second operation piece 30 is returned in the direction apart from the leg 21a on one side of the first operation piece 20 also due to the resilient restoring force of the clamp body 11 in the axial direction caused by offset of the second operation piece 30 relative to the first operation piece 20. Thus, the engaging claw 37 of the second operation piece 30 is opposed to the arch shaped opening 27 in the first operation piece 20. In this state, when stopping to apply a force to the operation portions 23 and 33 for bringing close to each other, the clamp body 11 constricts due to the resilient restoring force of the clamp body 11 (refer to FIGS. 5 and 6), and the engaging claw 37 passes through the arch shaped opening 27 (refer to FIG. 7). The hose tightens the piping member due to this constriction of the clamp body 11.

Figure 19:
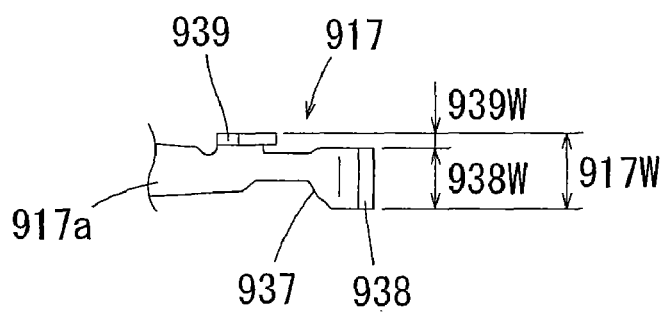
FIG. 19 is a plan view showing a second operation piece.

According to the aforementioned hose clamp 10, the width of the second operation piece 30 can be narrowed by disposing the engaging claw 37 and the slide guide portion 36 on one side of the leg 31 of the second operation piece 30. That is, because the engaging claw 37 and the slide guide portion 36 are disposed side by side with respect to the longitudinal direction of the leg 31 (horizontal direction in FIG. 8), width of the engaging claw 37 is included in a width of the operation portion 33. Thus, a width 30 W of the second operation piece 30 can be set to be equal to a width required for the operation portion 33, so that it is able to narrow the width 30 W of the second operation piece 30 to be less than the width 917 W of the aforementioned known hose clamp (refer to FIG. 19). Following this, a width 20 W of the first operation piece 20 (refer to FIG. 2) can be narrowed by narrowing a space between the legs 21a and 21b of the first operation piece 20, through which the second operation piece 30 passes. In this way, due to narrowing the width 20 W of the operation piece 20 and the width 30 W of the operation piece 30, it is able to downsize the hose clamp 10 (refer to FIGS. 1 and 2). This is effective for weight saving of the hose clamp 10.

And, the blank 10A of the hose clamp 10 (refer to FIG. 9) can be designed to have a shape more matching to Castigliano's theorem. Accordingly, it is able to increase roundness of the clamp body 11 and to make load distribution more evenly. This is effective to high stress type hose clamps.

And, it is able to easily form the engaging claw 37 of the second operation piece 30 by cutting and bending a side of the leg 31 of the operation piece 30, and it is also able to make the engaging claw 37 compact (refer to FIG. 7).

And, the engaging claw 37 of the second operation piece 30 is cut and bent by way of the slit 38 so as to be inclined. Therefore, when pinching the operation portions 23 and 33 by the tool, even if a rear surface of the engaging claw 37 is accidentally pinched, a leading end of the tool is slidably guided by the engaging claw 37, so that it is able to adequately pinch the operation portion 23 of the first operation piece 20. Accordingly, false operations such as pinching the engaging claw 37 can be prevented or reduced.

And, the engaging claw 37 of the second operation piece 30 is configured to have a tapered shape. Therefore, when the engaging claw 37 engages with the engaging depression 26 or leaves from the engaging depression 26, movement distance of the engaging claw 37 in the axial direction of the clamp body 11 can be reduced in comparison with an engaging claw formed to be constant in width from a base portion (on the side of the leg 31) to its leading end. Accordingly, it is able to downsize the guide edge 29 and the slide guide portion 36, thereby downsizing the hose clamp 10.

Next, first to fifth alternative embodiments of the hose clamp 10 of the above embodiment will be described. Here, FIG. 10 through FIG. 14 are perspective views showing the alternative embodiments of the hose clamp 10.

Figure 10:
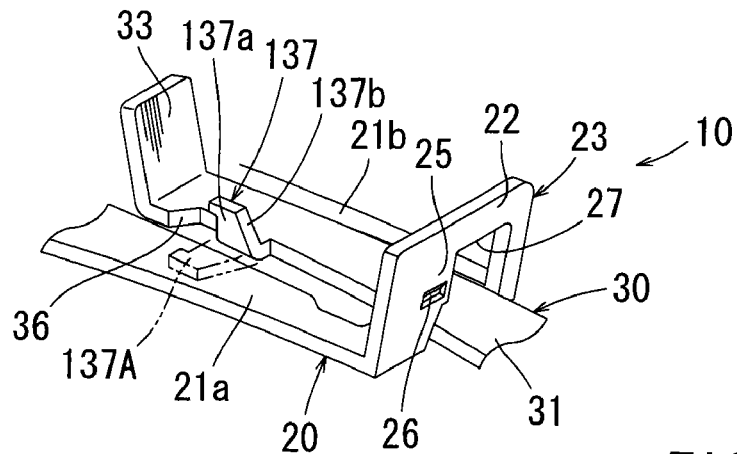
FIG. 10 is a perspective view showing a first alternative embodiment of a hose clamp.

In the first alternative embodiment, as shown in FIG. 10, the engaging claw 37 of the hose clamp 10 according to the embodiment is modified. That is, an engaging claw 137 is formed by bending a protrusion 137A protruding from one side of the leg of the second operation piece 30 outwardly in the radial direction of the clamp body 11. An engaging projection 137a protruding in a sharply-pointed manner toward the operation portion 23 of the first operation piece 20 and capable of engaging with the engaging depression 26 in the receiving portion 25 of the operation piece 20 is formed on a leading end of the engaging claw 137. In addition, the engaging claw 137 is formed to taper upwardly in FIG. 10, and an inclined guide surface 137b is formed on a rear surface of the engaging claw 137. When the operation portions 23 and 33 of the operation pieces 20 and 30 are pinched by a tool (not shown), even if the rear surface of the engaging claw 137 is accidentally pinched, a leading end of the tool is slidably guided by the guide surface 137b, so that it is able to pinch the operation portion 23 of the first operation piece 20. Therefore, the guide surface 137b can prevent or reduce false operations, such as pinching of the engaging claw 137. Furthermore, the guide surface 137b is formed to be able to slidably contact with the connecting portion 22 of the first operation piece 20, and facilitates deformation relating to at least one of constriction and expansion of the hose clamp 10 due to its slidable contact.

Figure 11:
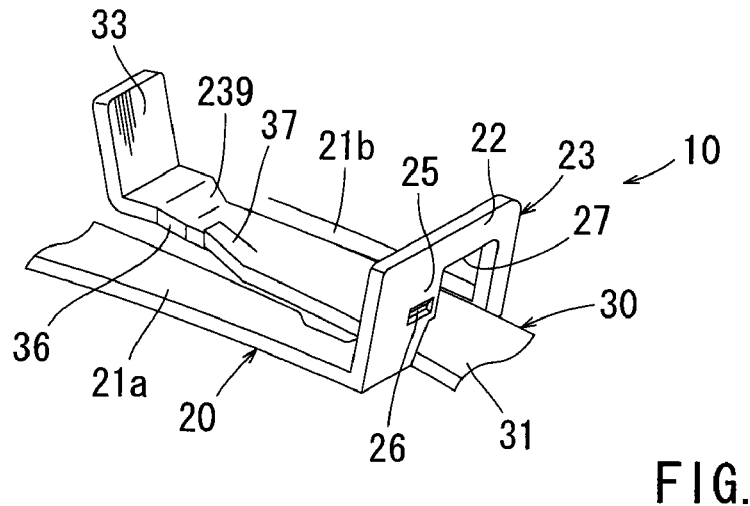
FIG. 11 is a perspective view showing a second alternative embodiment of a hose clamp.

In the second alternative embodiment, as shown in FIG. 11, the second operation piece 30 of the hose clamp 10 in the embodiment is modified. That is, a step is provided by folding the leg 31 of the second operation piece 30 in order to form an inclined portion 239 disposing the side of the operation portion 33 outwardly in the radial direction in comparison with the side of the clamp body 11. The inclined portion 239 is configured to slidably contact with the connecting portion 22 of the first operation piece 20, and facilitates deformation relating to at least one of constriction and expansion of the hose clamp 10 due to its slidable contact.

Figure 12:
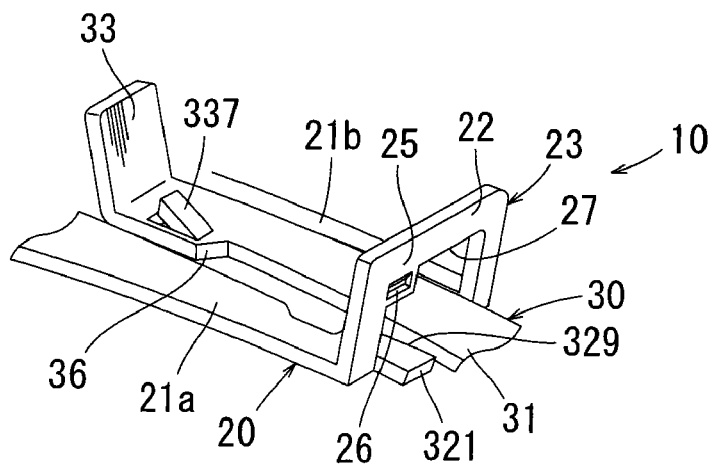
FIG. 12 is a perspective view showing a third alternative embodiment of a hose clamp.

In the third alternative embodiment, as shown in FIG. 12, the engaging claw 37 of the hose clamp 10 in the above embodiment is modified. That is, on the second operation piece 30, an engaging claw 337 is formed in a cut and raised manner on a side close to the operation portion 33 of the leg 31 and having the slide guide portion 36. More specifically, a substantial U-shape slit is formed in the leg 31, and a claw defined by the slit is bent so as to be inclined outwardly in the radial direction in order to form the engaging claw 337. In addition, instead of the guide edge 29 of the first operation piece 20 in the embodiment (refer to FIG. 4), an extending piece 321 is formed to extend backwardly from the leg 21a on one side of the operation portion 23 of the first operation piece 20. And, a guide edge 329 capable of slidably contacting with the slide guide portion 36 of the second operation piece 30 is formed on the extending piece 321. In accordance with this alternative embodiment, it is able to compactly form the engaging claw 337 on the leg 31 of the second operation piece 30.

Figure 13:
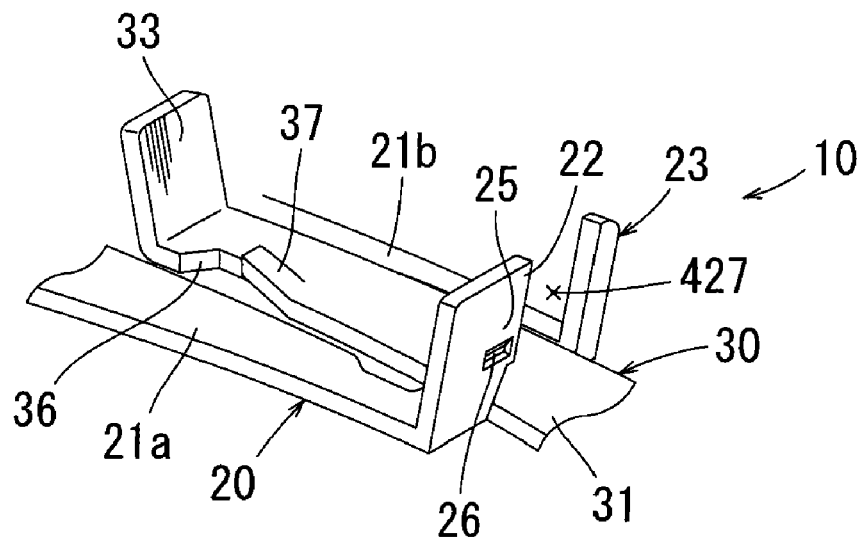
FIG. 13 is a perspective view showing a fourth alternative embodiment of a hose clamp.

In the fourth alternative embodiment, as shown in FIG. 13, the first operation piece 20 of the hose clamp 10 in the above embodiment is modified. That is, the connecting portion 22 of the above embodiment is divided into two separated parts by an opening 427.

Figure 14:
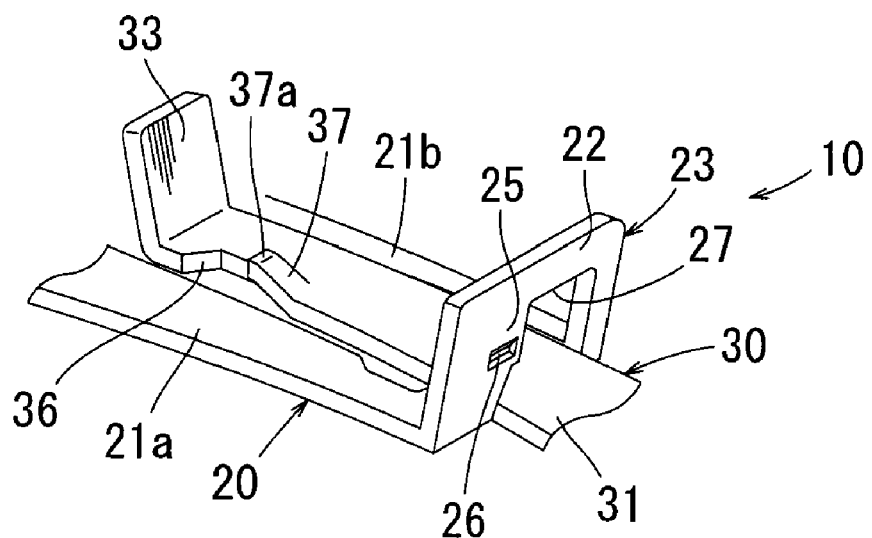
FIG. 14 is a perspective view showing a fifth alternative embodiment of a hose clamp.

In the fifth alternative embodiment, as shown in FIG. 14, the engaging claw 37 of the hose clamp 10 in the above embodiment is modified. That is, a leading end portion 37a of the engaging claw 37 in the above embodiment is bent toward the operation portion 33.

The present invention is not limited to the aforementioned embodiments, and modifications are possible without departing from the scope of the present invention. For example, the hose clamp 10 can be made of resin instead of metal. And, the engaging depression 26 in the receiving portion 25 of the first operation piece 20 can be replaced with a hole passing through the receiving portion 25. And, the engaging depression 26 in the receiving portion 25 of the first operation piece 20 can be omitted, and the engaging claws 37, 137 and 337 can engage with the receiving portion 25 by directly contacting therewith. And, although both of the guide edge 29 (329) and the slide guide portion 36 of the both operation pieces 20 and 30 are configured as inclined surface, one of the guide edge and the slide guide portion can be modified to have a shape slidably contacting with the other at one point. And, the clamp body 11 can be designed to have one or more slots at adequate area in addition to the one slot 12. Although the slot 12 is shown to have an elongated triangular shape in FIG. 9, the slot can be formed to have any shape. For example, the clamp body 11 can include a substantially rectangular slot extending in a circumferential direction and two triangular slots in adequate areas.

Figure 15:
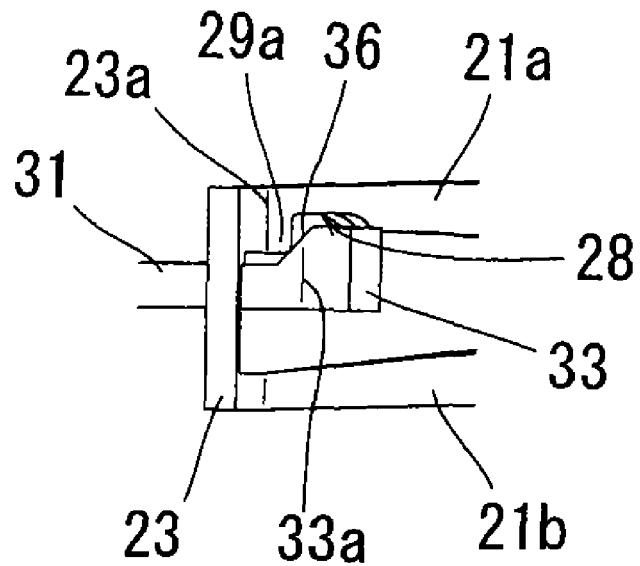
FIG. 15 is a plan view showing an alternative embodiment of an operation piece.

For example, as shown in FIG. 15, the guide edge 29 of the first operation piece 20 in the embodiment (refer to FIG. 2) can be changed to a guide edge 29a having a square corner contacting with the slide guide portion 36 of the second operation piece 30 at one point. And, a folding line 33a for bending the operation portion 33 of the second operation piece 30 outwardly in the radial direction is set in an area narrowed due to the slide guide portion 36 in the operation piece 30, so that it is able to bend the operation portion 33 along the folding line 33a. And, a folding line 23a for bending the operation portion 23 of the first operation piece 20 outwardly in the radial direction is located in an area having a constant width between the operation portion 23 and the guide edge 29a, so that the operation portion 23 can be accurately bent along the folding line 23a, and formability in press molding is improved.

Figure 16:
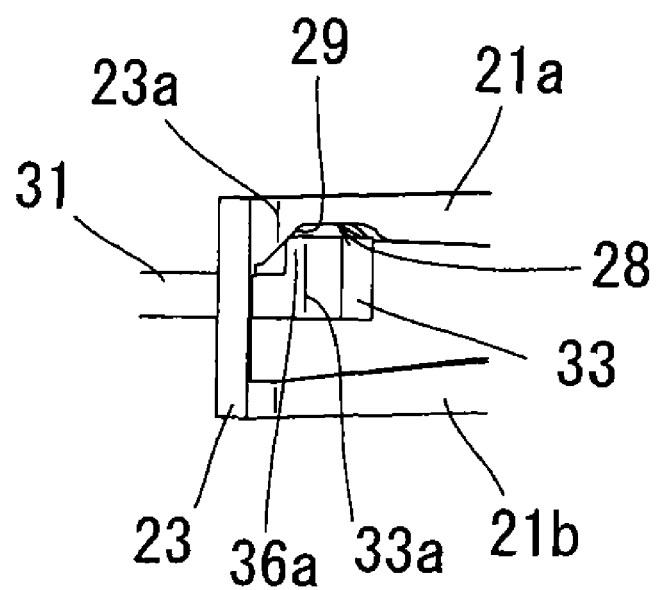
FIG. 16 is a plan view showing an alternative embodiment of an operation piece.
Figure 17:
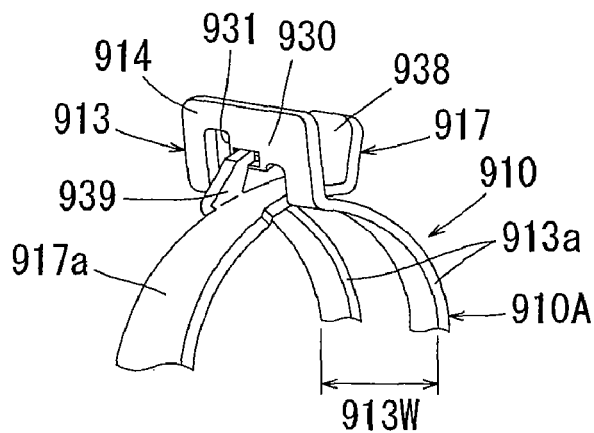
FIG. 17 is a perspective view of a main part of an expanded hose clamp of an example in prior art.
Figure 18:
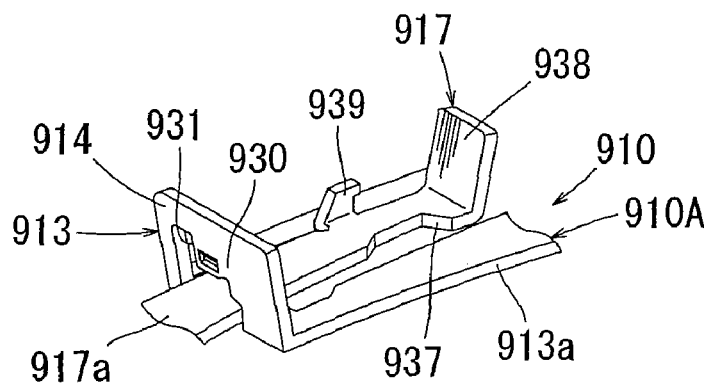
FIG. 18 is a perspective view of a main part of a constricted hose clamp.

As shown in FIG. 16, the slide guide portion 36 of the second operation piece 30 in the embodiment (refer to FIG. 2) can be changed to a slide guide portion 36a having a square corner contacting with the guide edge 29 of the first operation piece 20 at one point. In this case, the folding line 33a for bending the operation portion 33 of the second operation piece 30 outwardly in the radial direction is positioned at an area having a constant width between the operation portion 33 and the slide guide portion 36a, so that the operation portion 33 can be accurately bent along the folding line 33a, and formability in press molding is improved. In addition, the folding line 23a for bending the operation portion 23 of the first operation piece 20 outwardly in the radial direction is positioned at an area narrowed due to the guide edge 29 of the operation piece 20, so that it is able to bend the operation portion 23 along the folding line 23a.

The invention claimed is:
1. A hose clamp comprising:
a clamp body comprising a band-like resilient member curved into a ring shape and having a first operation piece and a second operation piece at opposite sides to each other with respect to a circumferential direction;

a pair of legs defining a slot therebetween in the first operation piece, wherein the second operation piece protrudes through the slot;

an engaging portion formed on the second operation piece;

a receiving portion formed on the first operation piece and capable of engaging with the engaging portion, wherein the engaging portion and the receiving portion can relatively move between an engaging position for engaging with each other and a disengaging position; and a slide guide portion formed on the second operation piece;

wherein when the engaging portion and the receiving portion relatively move from the engaging position to the disengaging position, the slide guide portion slidably contacts with one of the legs;

wherein the engaging portion and the slide guide portion are disposed on the same side with respect to a width direction of the second operation piece, and wherein the first operation piece has a guide edge at one of the legs, the guide edge is inclined outwardly with respect to the width direction toward an end of the first operation piece, and the slide guide portion slidably contacts with the one of the legs via the guide edge.

2. The hose clamp as in claim 1, wherein:

the engaging portion is disposed close to the slide guide portion.

3. The hose clamp as in claim 1, wherein the clamp body has a uniform thickness.

* * * * *